US006655083B2

United States Patent
Reed

(10) Patent No.: US 6,655,083 B2
(45) Date of Patent: Dec. 2, 2003

(54) PLANTER GARDEN SWING

(76) Inventor: Patricia M. Reed, 1422 N. McClellan St., Portland, OR (US) 97217

( * ) Notice: Subject to any disclaimer, the term of this patent is extended or adjusted under 35 U.S.C. 154(b) by 0 days.

(21) Appl. No.: 10/198,006

(22) Filed: Jul. 17, 2002

(65) Prior Publication Data

US 2002/0174600 A1 Nov. 28, 2002

(51) Int. Cl.$^7$ ................................................ A01G 9/02
(52) U.S. Cl. ......................................................... 47/67
(58) Field of Search .............................................. 47/67

(56) References Cited

U.S. PATENT DOCUMENTS

| | | |
|---|---|---|
| D231,587 S | 5/1974 | Herrera |
| D337,439 S | 7/1993 | Scott, Jr. et al. |
| 5,292,014 A | 3/1994 | Lelong |
| D355,774 S | 2/1995 | Proserpio |
| 5,749,623 A * | 5/1998 | Mistry et al. ............... 297/281 |
| 6,127,008 A * | 10/2000 | Ingebrigtson ................ 428/16 |

OTHER PUBLICATIONS

Fantasy & Ray's; Wooden Lawn Ornaments Advertisement; http://www.fantasylawnornaments.com/Planters.htm.*
Vaagmonterad Swing Planter Advertisement; http://www-.gardella.se/vagga.*
Victor L. Edwards, Oak and Rope Design; Super Double Oak Swing; http://web.archive.org/web/20010215145648/ http://oakandrope.com/a1.htm.*

* cited by examiner

Primary Examiner—Charles T. Jordan
Assistant Examiner—Francis T. Palo
(74) Attorney, Agent, or Firm—Birdwell, Janke & Durando, PLC

(57) ABSTRACT

A planter garden swing. An elongate swing seating member for seating at least one person is provided, and planter receptacles are preferably attached at opposite ends of the seating member. The planting receptacles are provided to hold soil or other support material for supporting a plant. The seating member includes at least two attachment members for attaching respective chains, ropes or other elongate flexible members, for connecting the swing to a structural support such as a tree limb, joist or the like.

20 Claims, 2 Drawing Sheets

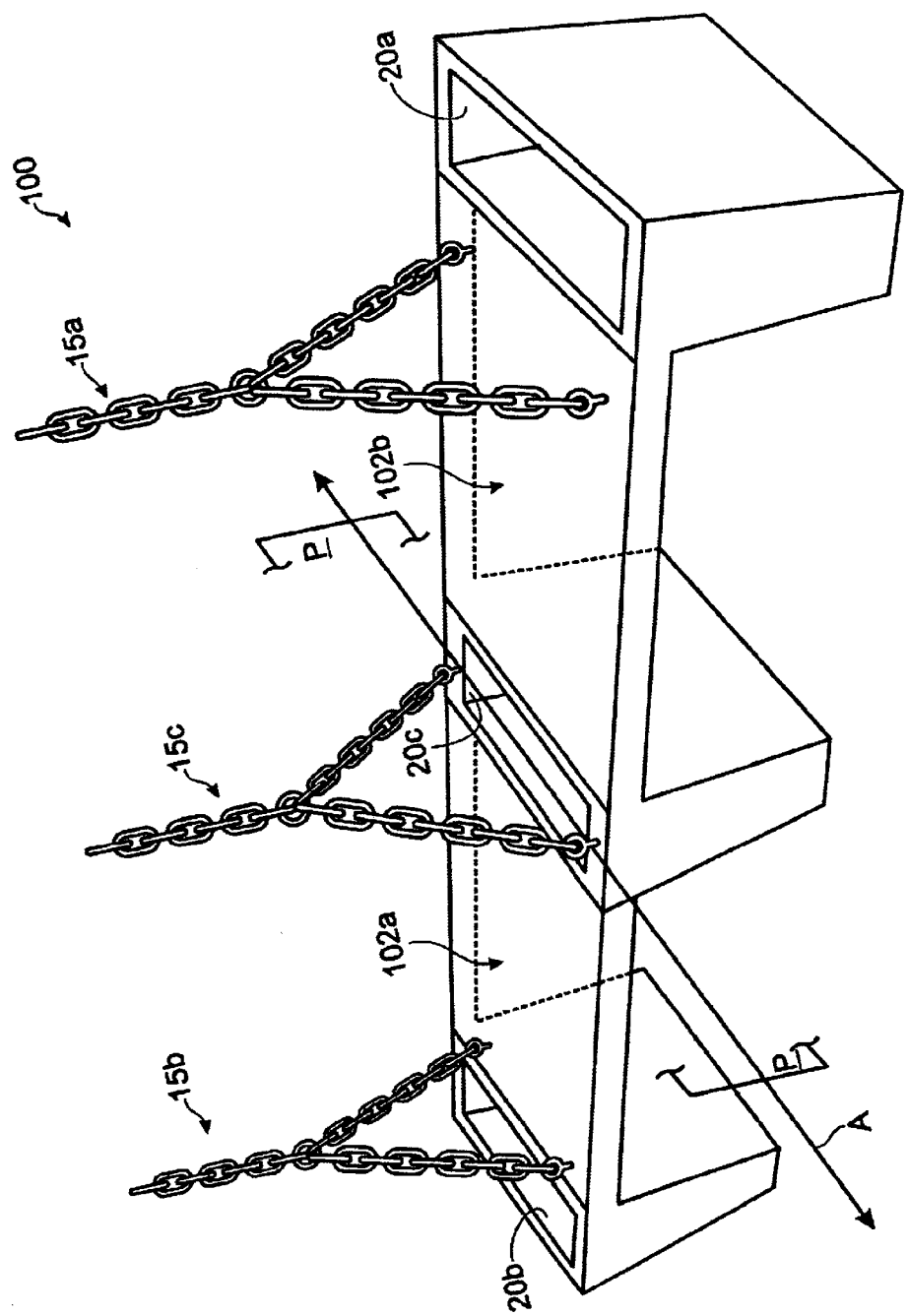

PLANTER GARDEN SWING

BACKGROUND OF THE INVENTION

This invention relates to a garden swing, particularly a garden swing having planters for containing and displaying garden plants.

Though gardens generally include garden plants, such as flowers and shrubs, that have been planted in flower beds and the like, it is also not uncommon for gardeners to include raised beds or planter boxes in the garden. If the garden area includes a tree, it is also not uncommon for gardeners to hang objects from the tree, such as bird-feeders and hanging planters.

Trees are also often used by children for play, and it is a childhood tradition to hang a swing from the tree. Adults also enjoy swings. Home-made swings typically comprise a simple plank of wood having holes drilled through ends of the plank to receive one or more knotted ends of rope. However, the aesthetics of such a swing can be a mis-match for a planned garden such as a Victorian garden. It would generally be desirable in such gardens to employ a swing that contributes to the design and plan of the garden.

One way to provide a swing meeting this objective is to include ornamental features on or in the swing. However, if the swing is provided with ornamental features by a mass manufacturer, there is a risk that a particular gardener will not like the ornamental features or, even if liking the features generally, will not find them suitable for the particular plan of his or her garden.

As was previously mentioned, it is often a gardener's desire to hang planters from trees. The swing is also typically attached to a tree. It is difficult to escape the cluttered look that results from hanging too many disparate objects from trees, even when the objects are not, by themselves, unattractive.

Considering all of the above, it is a problem of providing a mass produced swing that can be integrated, in an aesthetically pleasing way, into any given one of a variety of garden designs to suit a variety of gardener's tastes. Accordingly, there is a need for a planter garden swing providing for a configurable ornamentation for achieving visual consonance with any particular, custom garden. Moreover, there is a need for a planter garden swing providing visual appeal when used in a garden employing both a swing and a hanging planter.

SUMMARY OF THE INVENTION

A preferred embodiment of a planter garden swing according to the present invention includes an elongate swing seating member for seating at least one person, and respective planter receptacles at each of the opposite ends of the seating member. The planting receptacles are provided to hold soil or other support material for supporting a plant. The seating member includes at least two attachment members for attaching respective chains, ropes or other elongate flexible members, for connecting the swing to a structural support such as a tree limb, joist or the like.

Garden plants such as colorful flowers may be grown in the planter receptacles, so that the planter receptacles provide for a configurable ornamentation for the swing, i.e., the type and color of the plants may be selected to integrate visually with the rest of the garden. Moreover, the planter receptacles provide the benefit of a hanging planter and may substitute therefor, if desired.

Accordingly, it is a principal object of the present invention to provide a novel garden swing and method for providing configurable ornamentation therein.

The foregoing and other objects, features and advantages of the invention will be more readily understood upon consideration of the following detailed description of the invention, taken in conjunction with the following drawings.

BRIEF DESCRIPTION OF THE DRAWINGS

FIG. 2 is a pictorial view of a second embodiment of a garden swing according to the present invention.

DETAILED DESCRIPTION OF A PREFERRED EMBODIMENT

Figure 1:
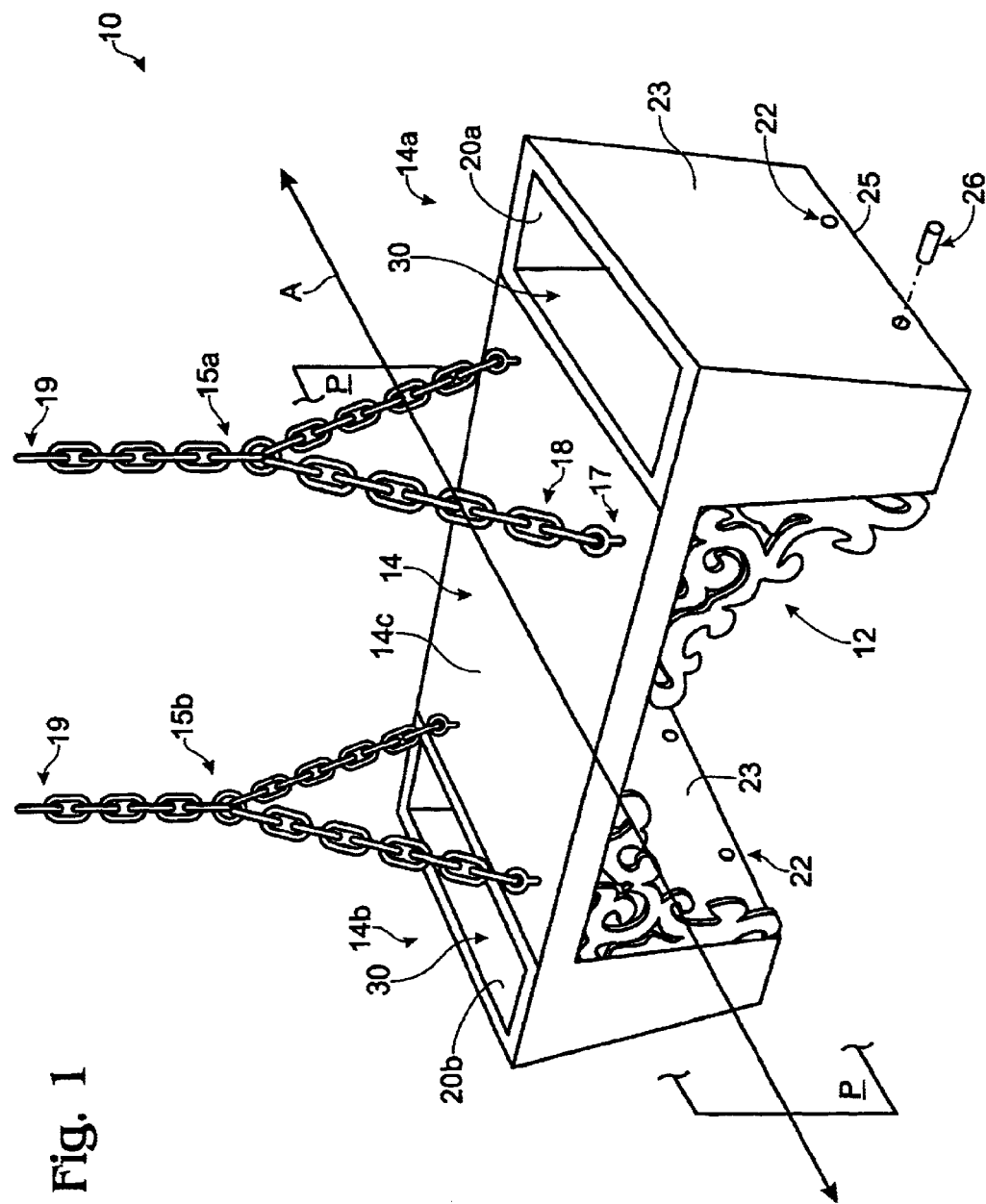
FIG. 1 is a pictorial view of a first embodiment planter garden swing according to the present invention.

FIG. 1 shows a preferred planter garden swing 10 according to the present invention. The swing 10 includes an elongate swing seating member 14 having two ends 14a and 14b and a seating surface 14c therebetween for supporting a human user of the swing. The user swings on the swing to and fro along a swing axis "A." The seating member 14 is adapted to be connected at the ends to respective elongate flexible members 15a, 15b, such as chains, ropes or cables. Preferably, four eye bolts or other suitable attachment members are attached to the seating member 14 at 17 for connection to respective ends 18 of the flexible members 15, and distal ends 19 of the flexible members 15 are attached with appropriate hardware to a structure (not shown), such as a tree limb or joist, sufficient to support the maximum load of the swinging swing. While providing hardware attached to the seating member is preferred, the attachment members may simply be holes through the seating member 14 providing the function of fixedly positioning the flexible members 15 at attachment points of intersection with the seating member. The swing may function as decoration; however, with suitable strength of materials it also provides the utility of a swing, such as may be used by adults or children for relaxation or play.

Respective planter receptacles 20a and 20b are provided at the ends 14a, 14b. The attachment points 17 are shown inboard of the planter receptacles, but may be outboard of the receptacles or laterally adjacent the receptacles as desired. The planter receptacles 20 are adapted to contain planting soil or other support material for supporting a plant (not shown). The plant is preferably a living plant, and may advantageously be a vining plant for vining around the flexible members 15 or the plant may produce colorful or scentful flowers, so it is contemplated to provide an environment in the planter receptacles sufficient to maintain the health of the plant for an extended period of time. However, the plant may be an artificial plant without departing from the principles of the invention, and the receptacles or their use may be adapted accordingly.

The type and color of the plants may be selected to integrate visually with the rest of the garden, or the plants may be selected to serve some other aesthetic or sensory purpose, such as to attract or repel insects, or to provide a pleasing scent. The planter receptacles also provide the benefit of a hanging planter, obviating the need for a separate hanging planter box.

To contain both the soil and the water needed to maintain the health of a living plant, the planter receptacles 20 are preferably provided with one or more drain holes 22, which may be located through sides 23 of the receptacles, or through bottoms 25 of the receptacles (not visible in the Figure). The drain holes are preferably provided with removable plugs 26 for stopping any water flow through the holes while swinging. The plugs are most simply and preferably adapted for an interference fit with the holes 22 with a tolerance that depends on the compliance of the materials used. The plugs may, however, be adapted to function as valves through which water can flow at an adjustable rate.

The receptacles 20 may be any desired shape suitable to support a plant, and while shown having upwardly facing openings 30 for receiving the plant and planting material, openings for this purpose may be provided on the sides of the receptacles in the alternative or in addition. The volume of the internal space defined by the receptacles is preferably limited in view of the weight of planting material which may be desired to fill the receptacles and the consequent load exerted on the swing and its supporting structure when the swing is fully loaded and in use. Preferably, the receptacles taper inwardly with distance downwardly from their openings such as shown in the Figures, so that less planting material is required to fill the receptacle for a given size of the opening 30 than would otherwise be required. Alternatively, the receptacles may be provided with raised bottom surfaces or light-weight filler material in the bottoms of the receptacles to decrease the weight of the fully loaded swing.

The swing 10 may include manufactured ornamentation such as indicated at 12 for visually enhancing its appeal to a set of gardeners having specific ornamental needs, such as the need to integrate the swing 10 into a Victorian garden. The manufactured ornamentation may be provided removably and selectably, to permit customization of the manufactured ornamentation. For example, the ornamentation 12 may be snap-fitted to the swing and be provided at the point of sale in a variety of styles. Notwithstanding, it is an outstanding feature of the invention to provide for selectable ornamentation in the form of plants as discussed above, and it is a further outstanding feature of the invention that it is not necessary to employ manufactured ornamental features in or on the swing 10 to ornament the swing.

Preferably, the body of the swing 10, comprising at least the seating member 14 and the planter receptacles 20, is formed in one-piece of molded structural or engineering plastic, e.g., by rotational or injection molding, so that the planter receptacles are integrally attached to the seating member. However, the planter receptacles may be attached as separate pieces to the seating member as well by any known joining means, such as bolts or screws, or complementary slide, press or snap fitting portions of the receptacles and seat member, or chemical, thermal or mechanical bonding means. In accord with standard practice where injection molding is used to form the body of the swing, appropriate stiffening webs may be provided in underneath portions of the body so as to be out of sight when the swing is installed.

It should be noted that one of the two planter receptacles shown in FIG. 1 may be omitted without departing from the principles of the invention; however, depending on the weight of the plant and planting material and the location of the attachment points 17 for the flexible members, this may cause an objectionable imbalance in the loading of the swing making it difficult for a user to swing to and fro along the swing axis "A" without twisting. Accordingly, preferred embodiments of a planter garden swing according to the present invention are balanced about the bisecting plane "P" containing the axis "A," preferably by being geometrically symmetric about this plane as shown.

A planter garden swing according to the present invention may also provide space for seating two or more people on the seating surface 14. Either or both additional flexible members and additional planter receptacles may be provided between adjacent seating positions. For example, FIG. 2 shows a garden planter swing 100 providing seating spaces 102a and 102b for seating two people, and having therebetween, in comparison to the garden swing 10 of FIG. 1, an additional flexible member 15c and supporting an additional planter receptacle 20c.

It is to be recognized that, while specific embodiments of planter garden swings according to the present invention have been shown and described as preferred, other configurations could be utilized, in addition to configurations already mentioned, without departing from the principles of the invention.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims that follow.

I claim:

1. A planter garden swing for attachment to a structural support, comprising:
    a seating member having at least one seating surface for seating a person; and
    a first planter receptacle integrally formed with said seating member, said receptacle having an open portion for insertion of a planting material and a bottom portion connected to one or more side portions defining a containing portion for containing the planting material for supporting a plant; and
    at least two attachment members defining respective fixed attachment points on opposite sides of said seating surface, for coupling said seating member to the structural support.

2. The garden swing of claim 1, further comprising at least two elongate flexible members connected to said seating member at the respective said attachment points, for hanging said seating member from the structural support.

3. The garden swing of claim 1, further comprising a second planter receptacle, said first planter receptacle being attached to one end of said seating member and said second planter receptacle being attached to an opposite end of said seating member.

4. The garden swing of claim 1, wherein said planter receptacle includes an upwardly facing opening.

5. The garden swing of claim 4, wherein one or more side-walls of said planter receptacle tapers inwardly with distance away from said opening.

6. The garden swing of claim 1, further comprising said planting material and said plant disposed in said receptacle.

7. The garden swing of claim 2, further comprising said planting material and said plant disposed in said receptacle.

8. The garden swing of claim 2, further comprising a second planter receptacle, said first planter receptacle being attached to one end of said seating member and said second planter receptacle being attached to an opposite end of said seating member.

9. The garden swing of claim 8, further comprising said planting material and said plant disposed in said receptacle.

10. The garden swing of claim 1, wherein said planter receptacle includes one or more drainage apertures.

11. The garden swing of claim 10, further comprising said planting material and said plant disposed in said receptacle.

12. The garden swing of claim 11, further comprising one or more plugs adapted to plug said one or more drainage apertures.

13. The garden swing of claim 2, wherein said planter receptacle includes one or more drainage apertures.

14. The garden swing of claim 13, further comprising said planting material and said plant disposed in said receptacle.

15. The garden swing of claim 8, wherein said planter receptacle includes one or more drainage apertures.

16. The garden swing of claim 15, further comprising said planting material and said plant disposed in said receptacle.

17. A method for providing ornamentation for a hanging garden swing, comprising the steps of:

provilding a planter receptacle integrally formed with the garden swing, the planter receptacle having an open portion for insertion of a planting material and a bottom portion connected to one or more side portions defining a containing portion for containing said planting material;

introducing planting material into said receptacle through said opening, said planting material being contained in said receptacle by said bottom portion and said one or more side portions; and planting a plant in said planting material through said opening.

18. The method of claim 17, further comprising providing water to said plant through said opening.

19. The method of claim 17, wherein a person sits on said swing.

20. The method of claim 19, wherein the person swings on said swing.

\* \* \* \* \*